F. A. ORVIS.
MOTOR VEHICLE.
APPLICATION FILED FEB. 16, 1916.

1,217,813.

Patented Feb. 27, 1917.
3 SHEETS—SHEET 1.

Witnesses
J H Crawford
Edwin D Jones

Inventor
F. H. Orvis,
By Victor J. Evans
Attorney

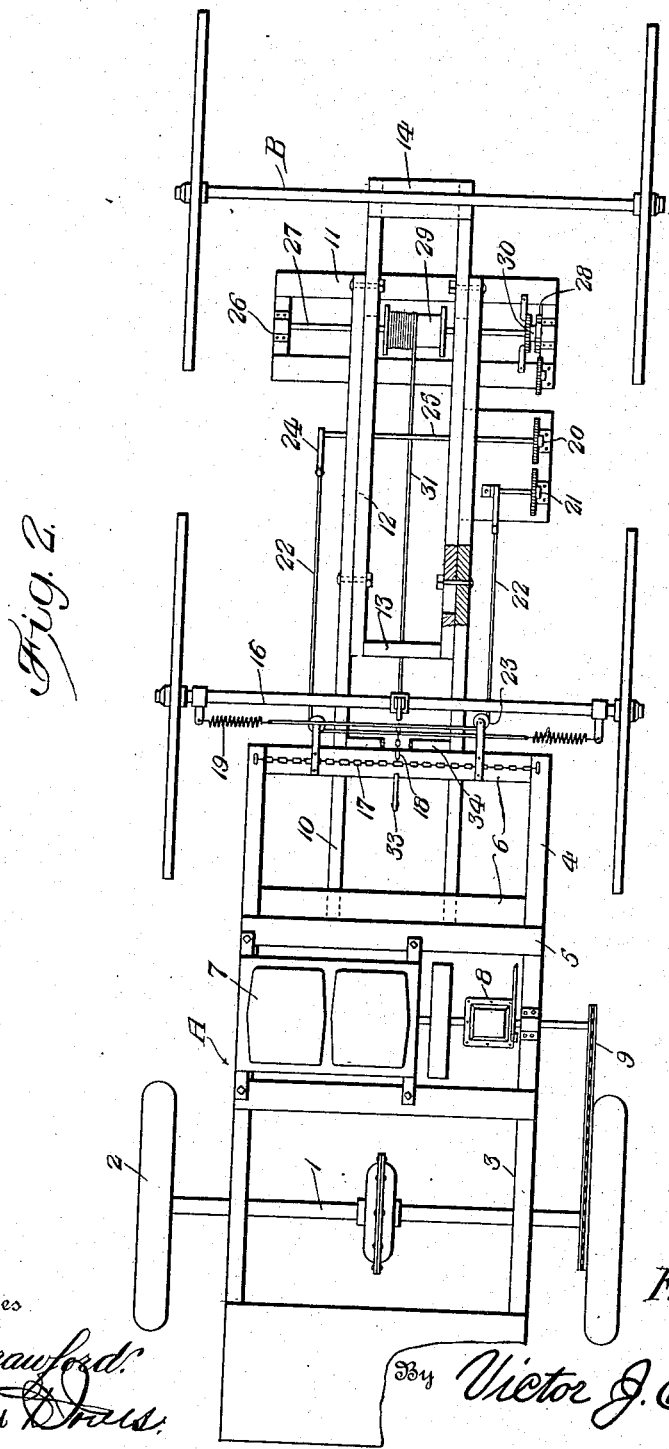

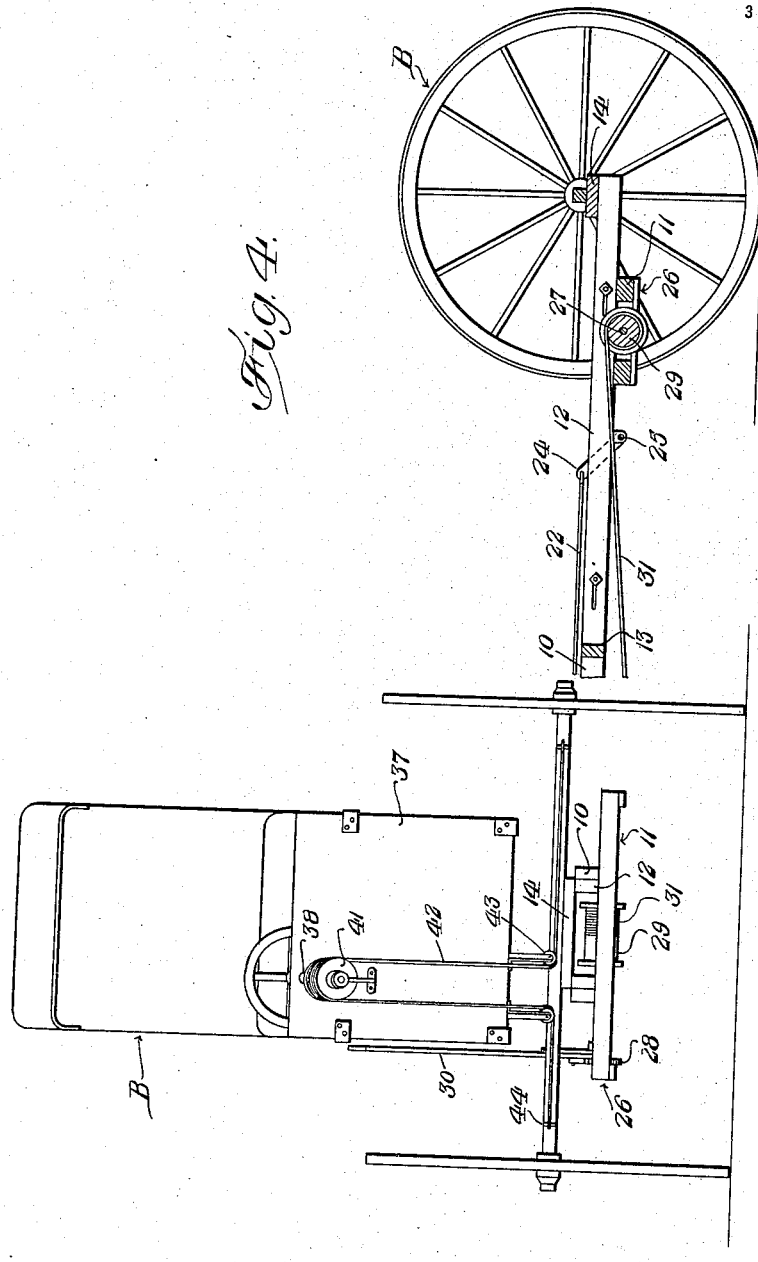

UNITED STATES PATENT OFFICE.

FRANK A. ORVIS, OF MILFORD, MICHIGAN.

MOTOR-VEHICLE.

1,217,813.  Specification of Letters Patent.  Patented Feb. 27, 1917.

Application filed February 16, 1916.  Serial No. 78,687.

*To all whom it may concern:*

Be it known that I, FRANK A. ORVIS, a citizen of the United States, residing at Milford, in the county of Oakland and State of Michigan, have invented new and useful Improvements in Motor-Vehicles, of which the following is a specification.

This invention relates to motor vehicles and has particular application to a six wheeled motor driven vehicle.

The chief characteristic of this invention resides in the provision of a motor driven truck which is adapted to accommodate a four wheeled vehicle of any common construction, the front wheels of the vehicle being dirigible whereby the motor vehicle may be steered.

Another important characteristic of this invention resides in the providing of a device of this character having means for elevating the rear wheels of the vehicle whereby the motor vehicle may be converted into a four wheeled vehicle.

Another important feature of this invention resides in the provision of a frame which is extensible to accommodate vehicles of various wheel bases.

A further purpose of this invention is to provide the attached vehicle with means for preventing lateral movement of the rear wheels thereof in either direction.

Other objects may appear as the specification is read in connection with the accompanying drawing in which:—

Fig. 2 is a top plan view,

Fig. 3 is a front elevation,

Fig. 4 is a detailed view of the supporting brackets of the extensible frame, both being shown in section.

Figure 1:
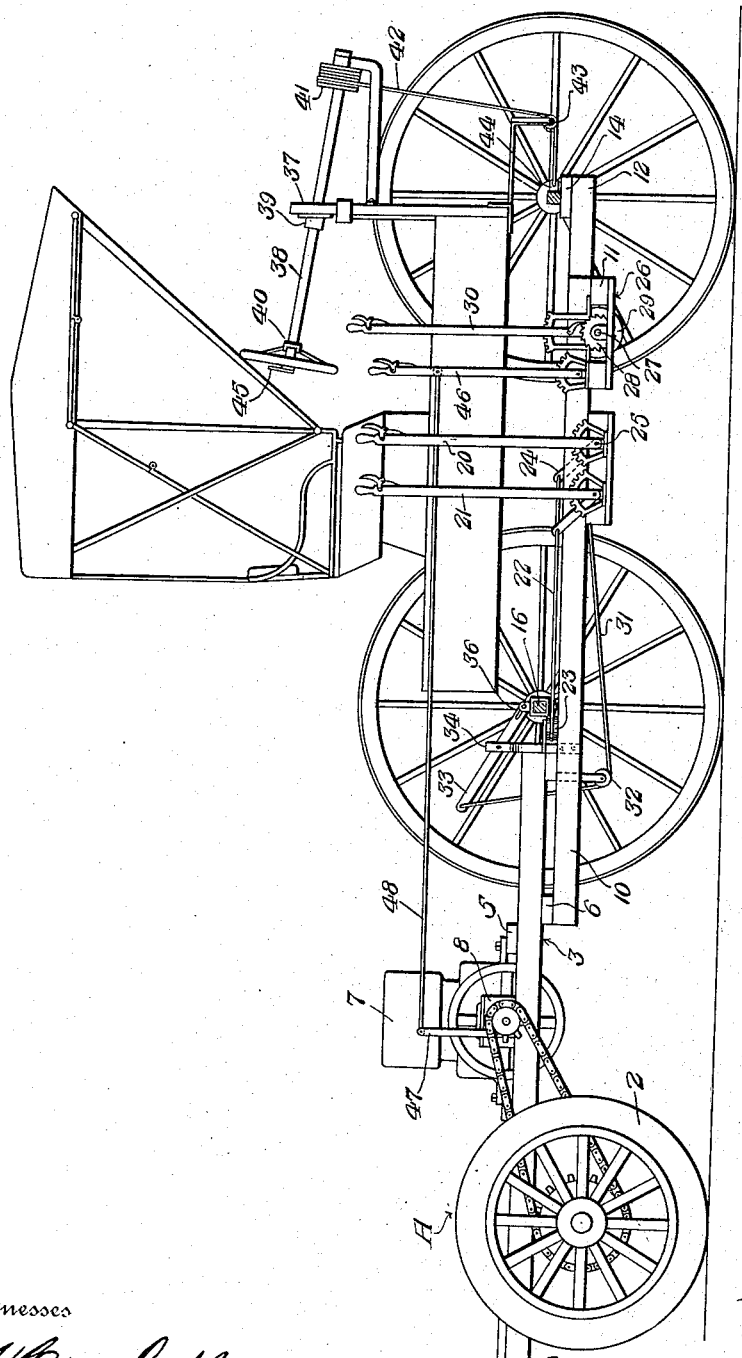
Figure 1 is a side elevation.

Referring more particularly to the drawings, A designates a motor vehicle which comprises a driven axle 1, upon which are journaled at the opposite extremities thereof, drive wheels 2. Rigidly mounted upon the axle 1 is a frame 3 or truck body which consists of a pair of longitudinally extending rods 4, the same being arranged in spaced parallel relation and connected by means of a transversely extending bar 5. The forward extremities of the longitudinally extending rods 4 are connected at their under sides by cross bars 6 which serve to retain the rods in their proper parallel spaced relation. As the specific arrangement of the driving means does not constitute a part of this invention, the same will not be described in detail. The motor 7 which is preferably an internal combustion engine, and the transmission 8 are arranged in any suitable manner upon the frame B rearwardly of the transversely extending bar 5, the transmission 8 being connected to the driving axle by means of the chain 9.

Rigidly secured to the under side of the cross bars 6 are the rigid sections 10 of the extensible frame, the sections being arranged in spaced parallelism and connected at their outer ends by the side members 11 of a drum supporting frame as will be hereinafter described. Telescopically arranged upon the rigid sections 10 are a pair of longitudinally extending sections 12, the movable sections being connected at their medial portions by a bar 13 while the outer extremities are inter-connected by an axle supporting plate 14.

B designates a vehicle of any common construction which has had the tongues thereof removed and which is arranged upon an extensible frame of the truck in such a manner as to cause the front axle of the vehicle to rest upon the axle plate 14, to which the axle is secured in any suitable manner. It will be understood that the movable sections of the extensible frame may be moved so as to engage the front axles of the vehicles of various wheel bases. The rear axle 16 of the vehicle will then be disposed adjacent the frame 3. To prevent any longitudinal movement of the vehicle upon the frame, I have provided the frame 3 at its forward end thereof with a chain 17 which extends transversely of the frame and which has its medial portion provided with a short section of chain 18, the same being connected with the rear axle of the vehicle.

To prevent lateral movement of the rear wheels of the vehicle when turning corners, the axle has secured to the opposite extremities thereof a pair of retractile helical springs 19 which have their free extremities connected to levers 20 and 21 through the medium of cables 22, the cables adapted to be trained over pulleys 23 which are mounted upon the frame 3. It will be noted that the levers 20 are adapted to operate the springs to prevent lateral movement of the axle and are arranged upon one side of the vehicle and in close proximity to each other, thus necessitating one of the cables to be connected to an offset portion 24 of a rod 25, the latter being formed integral with its respective operating lever and extending beneath the extensible frame. It will be seen from this construction that when the rear wheels of the vehicle are in contact with the ground that the usual skidding of the wheels incident to the turning of corners, will be prevented, owing to the fact that when the springs are drawn taut by the actuation of the levers, any lateral movement of the axle and consequently the wheels upon the frame will be prevented.

In the event that the operator desires to elevate the rear wheels of the vehicle, as would be the case in traveling over a straight road, I have provided a frame 26 upon the outer or forward end of the rigid sections 10 and in which is journaled a shaft 27. This shaft 27 has one of its extremities provided with a toothed wheel 28, while the medial portion of the shaft is adapted to rigidly support a drum 29. Pivotally mounted upon one extremity of the frame 26 is a drum actuating lever 30 which is provided with the usual pivotal pawls whereby upon reciprocation of the lever the pawls will engage the teeth of the wheel to cause the rotation of the shaft. Coiled about the drum 29 and having one extremity thereof permanently connected thereto, is a cable 31 which has its opposite extremity trained over a pulley 32 mounted on the frame 3 of the motor vehicle, and connected to one extremity of an elevating rod 33. This elevating rod 33 is pivotally mounted or fulcrumed at a point adjacent its forward end upon a substantially U-shaped yoke 34, the yoke having its opposite ends secured to the rigid sections of the extensible bracket. The forward end of the elevating rod is provided with a short length of cable 35 which is secured to the rear axle of the vehicle as at 36. It will be seen from this construction that upon the actuation of the lever 30, the pawls mounted thereon will be caused to engage the wheel 28 upon the shaft 27 whereby the drum 29 will be caused to rotate. From the rotation of the drum the cable 31 will be wound thereupon whereby the forward end of the elevating rod will be actuated to lift the rear axle of the vehicle, and cause the rear wheels of the vehicle to be lifted from the ground.

37 designates a frame which is secured to the dash of the vehicle and in which a steering rod 38 is journaled. The steering rod then extends through a portion of the frame as at 39 and has its opposite extremities disposed adjacent the seat of the vehicle as at 40. Rigidly mounted upon the forward end of the steering rod 38 is a drum 41 about which is wound a cable 42, the opposite extremities of the cable passing over pulleys 43 secured to the frame at the opposite sides thereof, the terminals of the cable being secured to the opposite extremities of the front axle of the vehicle as at 44. Although I have described a specific means of steering the front wheels of a vehicle, I wish it to be understood that any suitable means may be used. Mounted upon the steering rod adjacent the steering wheel, is the control mechanism for the gas and spark of the internal combustion engine, the controlling levers being designated as at 45 to which are connected cables (not shown) which are adapted to pass over pulleys suitably arranged upon the motor vehicle and connected to the carbureter and magneto.

In order to provide for the controlling of the high speed of the engine, I have provided the side of the vehicle B with a pivoted lever 46 which is rigidly connected to a high speed controlling lever 47 arranged adjacent the transmission gearing, by means of a rod 48, whereby upon movement of the lever 46 the lever 47 will be moved to actuate the gears of the transmission, throwing the vehicle into high speed. Suitable foot levers may be mounted within the floor of the vehicle for actuating the brakes to control the speed and brakes of the motor vehicle. These do not constitute a part of this invention and therefore the same have not been shown.

It is thought from the foregoing taken in connection with the accompanying drawing that the construction and operation of my device will be apparent to those skilled in the art without further description, and that minor changes, of the shape, proportions and minor details of construction may be made without departing from the spirit and scope of the appended claims.

What I claim,

1. In combination with a wheeled vehicle, a motor driven vehicle, an extendible frame attached to said motor driven vehicle, means mounted on the extensible frame for controlling the motor of said motor driven vehicle, and means operable from said wheeled vehicle for elevating the rear wheels of the wheeled vehicle.

2. In combination with a wheeled vehicle, a motor driven vehicle having an extensible frame, means mounted on the frame for controlling the motor of the motor driven vehicle, and means mounted on the motor driven vehicle for preventing lateral movement of the rear wheels of said wheeled vehicle.

3. In combination with a wheeled vehicle, a motor driven vehicle, an extensible frame attached to said motor driven vehicle, means mounted on the frame for controlling the motor of the motor driven vehicle, and means mounted on the motor driven vehicle and engageable with the rear axle of said wheeled vehicle for preventing lateral movement of the rear wheels thereof.

4. In combination with a wheeled vehicle, a motor driven vehicle, an extendible frame attached to said motor driven vehicle, means mounted on the extendible frame for controlling the motor of the motor driven vehicle, and adjustable means for preventing the lateral movement of the rear wheels of said wheeled vehicle.

5. In combination with a wheeled vehicle, a motor driven vehicle, means mounted on said motor driven vehicle and operable from said wheeled vehicle for controlling the motor of said motor driven vehicle, and resilient means for preventing lateral movement of the rear wheels of said wheeled vehicle.

6. In combination with a wheeled vehicle, a motor driven vehicle, a frame adjustably mounted on the frame of said motor driven vehicle, means mounted on said adjustable frame for controlling the motor on said motor driven vehicle, and adjustable resilient means for preventing lateral movement of the rear wheels of said wheeled vehicle.

7. In combination with a wheeled vehicle, a motor driven vehicle, an extendible frame attached to the motor driven vehicle, means mounted on the extendible frame for controlling the motor of the motor driven vehicle, and means operable from the wheeled vehicle for preventing lateral movement of the rear wheels of said wheeled vehicle in either direction.

8. In combination with a wheeled vehicle, a motor driven vehicle, an extensible frame secured to the said motor driven vehicle, means on said frame and operable from said wheeled vehicle for controlling the motor on said motor vehicle, means operable from said wheeled vehicle for elevating the rear wheels of said wheeled vehicle, and means for preventing longitudinal and lateral movement of the rear wheels of said wheeled vehicle upon said frame.

In testimony whereof I affix my signature in presence of two witnesses.

FRANK A. ORVIS.

Witnesses:
DONALD F. NOBLE,
ALLEN C. ORVIS.

Copies of this patent may be obtained for five cents each, by addressing the "Commissioner of Patents, Washington, D. C."